June 23, 1953     H. M. STEPHENSON ET AL     2,642,740
TORQUE MEASURING DEVICE
Filed Dec. 31, 1949
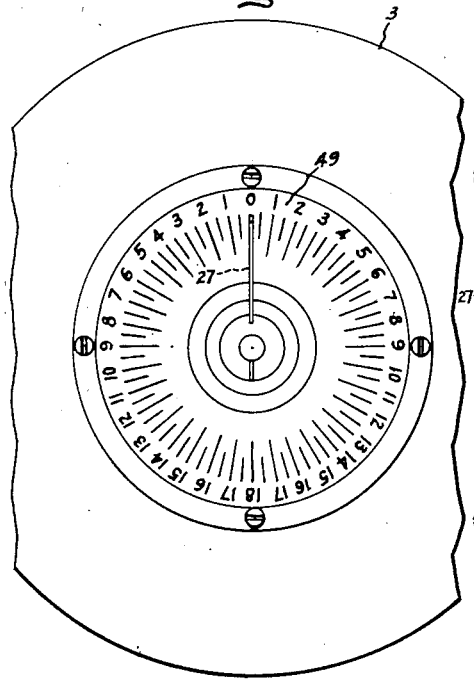
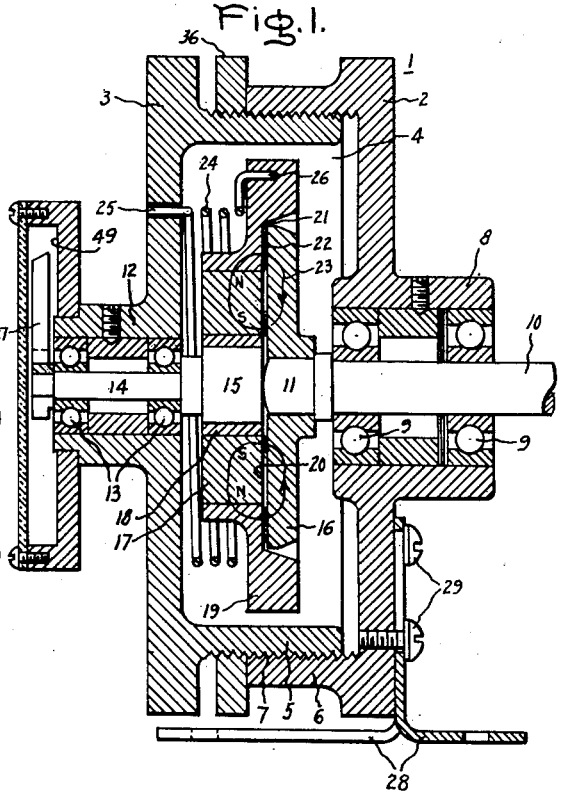
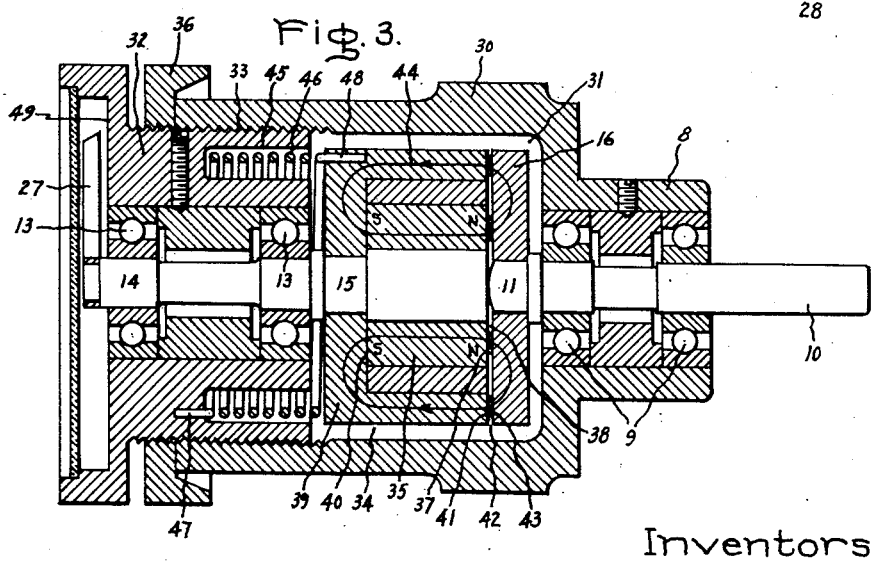
Inventors:
Hugh M. Stephenson,
Karl M. Feiertag,
by Ernest K. Britton
Their Attorney.

Patented June 23, 1953

2,642,740

UNITED STATES PATENT OFFICE 2,642,740

TORQUE MEASURING DEVICE

Hugh M. Stephenson and Karl M. Feiertag, Fort Wayne, Ind., assignors to General Electric Company, a corporation of New York Application December 31, 1949, Serial No. 136,266

2 Claims. (Cl. 73—134)

This invention relates to torque measuring devices and in particular to such a device utilizing a permanent magnet and a magnetic fluid to provide torque demand.

An object of this invention is to provide an improved torque measuring device.

Another object of this invention is to provide a small and simple torque measuring device suitable for hand use.

A further object of this invention is to provide an improved torque measuring device wherein the torque demand can be readily varied.

A still further object of this invention is to provide an improved torque measuring device wherein the torque demand is provided without frictional engagement or the utilization of eddy currents.

Further objects and advantages of this invention will become apparent, and the invention will be better understood from the following description referring to the accompanying drawing, and the features of novelty which characterize this invention will be pointed out with particularity in the claims annexed to and forming a part of this specification.

In accordance with this invention, there is provided a stationary housing or frame member having a rotatable input shaft journaled therein for connecting the measuring device to a rotating machine to measure the torque thereon, and a rotatable indicating shaft also journaled therein. An armature member is mounted on the input shaft and an annular permanent magnet member is mounted on the indicating shaft defining an air gap with the armature member. A magnetic fluid, for instance one having magnetic iron particles suspended in oil, is arranged in the air gap and is solidified by the permanent magnet flux traversing the air gap to provide the torque demand on the input shaft. Resilient means are provided for normally holding the permanent magnet member in a zero position with respect to the frame member and for resisting the turning of the permanent magnet member away from the zero position so that the angular displacement of the permanent magnet member indicates the torque demand on the rotating machine when the input shaft of the measuring device is connected thereto. A scale of torque indications is provided on the frame member and an indicator is affixed to the indicating shaft cooperating with the scale to show the angular displacement of the permanent magnet member. Means are provided to adjust the width of the air gap to vary the torque demand on the input shaft.

In the drawing, Fig. 1 is a side elevational view, partly in section, illustrating the improved torque measuring device of this invention; Fig. 2 is a fragmentary end view of the device of Fig. 1 showing the torque indicating scale; and Fig. 3 is a side elevation view, partly in section, illustrating a modification of the device of Fig. 1.

Referring now to Fig. 1, there is shown a stationary housing or frame member, generally identified as 1, having a first cup shaped portion 2 and a second cup shaped portion 3, both preferably formed of non-magnetic material defining a cavity 4 therein. The annular flange portion 5 of the cup shaped portion 3 is provided with external threads cooperating with internal threads on the annular flange portion 6 of the cup shaped portion 2, as at 7, providing for adjustment of the torque demand of the device as will be hereinafter described. The cup shaped member 2 is provided with a bearing housing portion 8 in which bearings 9, preferably of the antifriction type, are arranged. A rotatable input shaft 10 is journaled in the bearings 9 and has a portion 11 extending into the cavity 4. The input shaft 10 provides means for connecting the device to a rotating machine so that the torque thereon may be measured, as will be hereinafter described. The cup shaped portion 3 is also provided with a bearing housing 12 in which antifriction bearings 13 are arranged and indicating shaft 14, formed of non-magnetic material, is journaled in the bearings 13. The indicating shaft 14 is also provided with a portion 15 extending into the cavity 4. An annular armature member 16 formed of magnetic material, such as soft steel, is mounted on the extension portion 11 of the shaft 10 and an annular permanent magnet 17 is cast around a spacer 18, which in turn is mounted on the extension portion 15 of the indicating shaft 14. An annular ring portion 19 formed of magnetic material is secured to the outer surface of the permanent magnet 17.

The premanent magnet 17 is polarized radially, as shown in Fig. 1, so that the poles appear as two concentric rings on the magnet face 20 adjacent the armature member 16. The magnet face 20 and the armature member 16 define an air gap 21 in which is arranged a magnetic fluid 22, for instance one having magnetic iron particles suspended in oil. The permanent magnet flux traverses the air gap 21 and the armature member 16, as shown by the arrows 23, thus solidifying the magnetic fluid 22 to provide a torque demand on the input shaft 10. The threaded connection 7 between the cup shaped portions 2 and 3 of the housing member 1 permit adjustment of the width of the air gap 21 to vary the amount of the torque demand on the input shaft 10. A calibrated coil spring 24 is provided having one end 25 secured to the cup shaped portion 3 and its other end 26 secured to the ring portion 19. The spring 24 serves to normally hold the permanent magnet assembly 17, 18, and 19 and the indicating shaft 14 in a zero position with reference to the cup shaped portion 3 and to resist the turning of the permanent magnet assembly away from the zero position. A scale of torque indications 49 is secured to the bearing housing 12 of the cup shaped portion 3 and an indicator 27, which cooperates with the scale 49, is secured to the indicating shaft 14. The scale 49 can be conveniently calibrated, for instance in ounce-inches, and the indicator 27 shows the angular displacement of the permanent magnet assembly to indicate the torque demand on the rotating machine when the input shaft 10 is connected thereto. The spring 24 restrains the permanent magnet assembly in either direction of rotation and therefore the scale 49 is calibrated to read for both directions of rotation. Locking ring 36 serves to lock housing portion 3 in place when the proper air gap setting has been obtained.

In operation, the input shaft 10 is connected to a rotating machine and the torque demand is established by adjustment of the air gap 21 by screwing the cup shaped portion 3 in or out of the cup shaped portion 2. Assume, for instance, that a torque demand of 12 oz. inches is provided by adjustment of the width of the air gap 2. If the maximum drive torque of the machine coupled to the input shaft 10 is within this range, rotation of the input shaft 10 and the armature member 16 will rotate the permanent magnet assembly 17, 18, and 19, by virtue of the driving connection established by the solidified magnetic fluid 22, against the restraining influence of the spring 24. When the maximum drive torque of the rotating machine has been reached, the spring 24 will stall the machine at that point and the indicator 27 will show the angular displacement of the permanent magnet assembly on the scale 49 thus showing the stalling torque of the rotating machine. Since, in this instance, the stalling torque is assumed to be below the torque demand provided by the adjustment of the width of the air gap 21, the armature 16 will not slip with respect to the permanent magnet assembly. Assuming, however, that the maximum driving torque of the test machine is higher than the torque demand established by adjustment of the air gap 21, the armature 16 will slip with respect to the permanent magnet assembly when the torque demand provided by the air gap adjustment is reached and this torque demand will be indicated by the indicator 27 on the scale 49. From this point, adjustment of the width of the air gap 21 to narrow the air gap raises the torque demand until the stalling torque is reached and thus the maximum drive torque immediately before the stalling point can be determined.

It will now be readily apparent that this improved torque measuring device can be utilized as a test brake for small apparatus, such as fractional horsepower motors. In this case, the desired torque demand can be established by adjustment of the air gap 21 and it can then be readily ascertained whether the test machine will drive the torque demand. Alternatively, the maximum driving torque of the machine can be ascertained by adjusting the width of the air gap 21 until the stalling point is reached. It will be readily apparent that a device of this type can be constructed in a small size for hand use or the cup shade portion 2 can be permanently secured to a suitable base by means of supports 28 secured to the cup shaped portion 2 in any suitable manner as by screws 29.

Referring now to Fig. 3, in which like parts are indicated by like reference numerals, there is shown a modified form of the improved torque measuring device of this invention wherein a hollow cup shaped housing or frame member 30 is provided having a cavity 31 formed therein. The housing member 30 is provided with a bearing housing 8 in which antifriction bearings 9 are arranged, which in turn rotatably support the input shaft 10. The input shaft 10 is provided with a portion 11 extending into the cavity 31 on which is mounted an armature member 16 formed of magnetic material. A plug portion 32 is provided having a threaded outer surface cooperating with threads on the inner surface of the cup shaped member 30, as at 33, to provide for adjustment of the air gaps, as will be hereinafter described. Antifriction bearings 13 are mounted within the plug member 32 and rotatably support the non-magnetic indicating shaft 14. The indicating shaft 14 is provided with a portion 15 extending into the cavity 31 on which a permanent magnet assembly, generally identified as 34, is mounted. Permanent magnet assembly 34 includes an annular permanent magnet 35 mounted on indicating shaft 14. The permanent magnet 35 is polarized axially as shown in Fig. 3, and its face 37 forms an air gap 38 with the armature member 16. A cup shaped pole piece member 39 is arranged abutting the other face 40 of the permanent magnet 35 and is formed with its face portion 41 defining a second air gap 42 with the armature member 16. A magnetic fluid 43, for instance one having magnetic particles of iron suspended in oil, is arranged in the air gaps 42 and 38 and is solidified by the permanent magnet flux traversing the air gaps as shown by the arrows 44. The solidified magnetic fluid, as described above in connection with Fig. 1, provides the torque demand on the input shaft 10, the magnitude of this torque demand being established by adjustment of the air gaps 42 and 38 which is accomplished by screwing the plug member 32 in or out of the cup shaped member 30. Locking ring 36 serves to hold plug member 32 in place when the proper air gap setting has been obtained.

In order to provide for normally holding the permanent magnet assembly 34 in a zero position with respect to the cup shaped housing member 30 and for resisting the turning of the permanent magnet assembly away from this zero position, an annular recess 45 is formed in the plug member 32 in which a calibrated coil spring 46 is arranged. The spring 46 has one end 47 secured to the plug member 32 and its other end 48 secured to pole piece 39. The torque indicating scale 49 is secured to the end of the plug 32 and an indicator 27 is mounted on the indicating shaft 14. The operation of the modified device of Fig. 3 is identical with the operation of the device of Fig. 1.

It will now be readily apparent that this invention provides a simple and inexpensive torque measure device which is suitable for hand use. The torque demand is not provided by frictional engagement or eddy currents and therefore no wearing or excitation are encountered. Since a permanent magnet is utilized to provide the flux for solidifying the magnetic fluid, no external excitation is necessary. The torque demand provided by the solidified magnetic fluid is inherently smooth and there is no increase in torque demand at the static breakaway point.

While we have illustrated and described particular embodiments of this invention, modifications thereof will occur to those skilled in the art. We desire it to be understood, therefore, that this invention is not to be limited to the particular arrangements disclosed, and we intend in the appended claims to cover all modification which do not depart from the spirit and scope of our invention.

What we claim as new and desire to secure by Letters Patent of the United States is:

1. A torque measuring device comprising a stationary frame member, another frame member, a rotatable input shaft journaled in said stationary frame member for connecting said measuring device to a rotating machine to measure the torque thereon, a rotatable indicating shaft journaled in said other frame member coaxially with said input shaft, an armature member mounted on said input shaft, a permanent magnet assembly including an annular permanent magnet mounted on said indicating shaft and defining an axial air gap with said armature member, said air gap having a magnetic fluid arranged therein adapted to be solidified by the permanent magnet flux traversing said air gap for providing a torque demand on said input shaft, a calibrated coil spring surrounding said indicating shaft and having one end secured to said other frame member and its other end secured to said permanent magnet assembly for normally holding said permanent magnet assembly in a zero position with respect to said other frame member and for resisting the turning of said assembly away from said zero position whereby the angular displacement of said permanent magnet member indicates the torque demand on said rotating machine when said input shaft is connected thereto, a scale of torque indications on said other frame member, and indicator means on said indicating shaft cooperating with said scale for showing the angular displacement of said permanent magnet assembly, said other frame member coaxially threadingly engaging said stationary frame member thereby to adjust the width of said gap to vary the torque demand on said input shaft.

2. A torque measuring device comprising a stationary frame member having a cylindrical portion defining a cavity and a hub portion, a rotatable input shaft journaled in said stationary frame member hub portion for connecting said measuring device to a rotating machine to measure the torque thereon, another frame member having a hub portion with an annular recess formed in one axial end thereof, a rotatable indicating shaft journaled in said other frame member hub portion coaxial with said input shaft, an armature member mounted on said input shaft within said stationary frame member cavity, a permanent magnet assembly including an annular permanent magnet mounted on said indicating shaft and defining an axial air gap with said armature member, said air gap having a magnetic fluid arranged therein adapted to be solidified by the permanent magnet flux traversing said air gap for providing a torque demand on said input shaft, a calibrated coil spring arranged in said other frame member recess and having one end secured to said other frame member and its other end secured to said permanent magnet assembly for normally holding said permanent magnet assembly in a zero position with respect to said other frame member and for resisting the turning of such permanent magnet assembly away from said zero position whereby the angular displacement of said permanent magnet member indicates the torque demand on said rotating machine when said input shaft is connected thereto, a scale of torque indications on said other frame member, and indicator means on said indicating shaft cooperating with said scale for showing the angular displacement of said permanent magnet assembly, said stationary frame member having threads formed on the interior of its cylindrical portion, said other frame member having threads formed on the outer periphery of its hub portion engaging said stationary frame member threads thereby to adjust the width of said gap to vary the torque demand on said input shaft.

HUGH M. STEPHENSON.
KARL M. FEIERTAG.

References Cited in the file of this patent

UNITED STATES PATENTS

| Number | Name | Date |
|---|---|---|
| 2,493,758 | Friedrich | Jan. 10, 1950 |
| 2,519,449 | Findley | Aug. 22, 1950 |
| 2,525,571 | Winther | Oct. 10, 1950 |

FOREIGN PATENTS

| Number | Country | Date |
|---|---|---|
| 406,836 | Germany | Dec. 3, 1924 |
| 485,591 | Belgium | Oct. 30, 1948 |

OTHER REFERENCES

Publication in Technical News Bulletin, National Bureau of Standards, vol. 32, No. 5, May 1948, pages 54–60, entitled "Magnetic fluid clutch."

Publication entitled "The magnetic fluid clutch," by Jacob Rabinow, in Transactions of A. I. E. E., Dec. 13, 1948, vol. 67, 8 pages.